United States Patent [19]

Layson

[11] Patent Number: 4,550,518
[45] Date of Patent: Nov. 5, 1985

[54] FISH DECOY

[76] Inventor: Alfred M. Layson, 771 N. Walnut, Waukegan, Ill. 60085

[21] Appl. No.: 532,409

[22] Filed: Sep. 15, 1983

[51] Int. Cl.⁴ .......................................... A01M 31/06
[52] U.S. Cl. ................................................ 43/2; 43/4
[58] Field of Search ............... 43/2, 4, 4.5, 42.33, 43/42.74

[56] References Cited

U.S. PATENT DOCUMENTS

| | | | |
|---|---|---|---|
| 255,671 | 3/1882 | Reynolds | 43/10 |
| 2,054,407 | 9/1936 | Campbell | 43/27.4 |
| 2,933,847 | 4/1960 | Frasure | 43/42.33 |
| 3,186,120 | 6/1965 | Layson | 43/4 |

Primary Examiner—Gene P. Crosby
Attorney, Agent, or Firm—Leydig, Voit, Osann, Mayer & Holt, Ltd.

[57] ABSTRACT

A fishing decoy made up of thin sheets of transparent material with a plurality of inflatable fish images projected thereon, for the purpose of attracting fish to a particular fishing area. The transparent sheets carry a plurality of fish images in color, with a pictorial of seaweed and the like surrounding the fish images so that they appear to be swimming in their natural habitat. The transparent sheets have an air flotation chamber extending along the upper edge and a series of weights attached along the lower edge to maintain the sheet in a substantially vertical plane. Wave action and other external forces cause a rippling action in the sheets giving the fish images the appearance of swimming and a more life-like appearance.

3 Claims, 2 Drawing Figures

FISH DECOY

FIELD OF THE INVENTION

The invention relates generally to a fishing decoy for the purpose of attracting fish to a particular area. More particularly, a transparent sheet with a plurality of fish-like images projected thereon, is submerged in an area where someone is fishing in order to lure fish into the area.

BACKGROUND OF THE INVENTION

Generally speaking, the prior art shows fish-like images projected on a transparent sheet and submerged in the water for the purposes of attracting fish (see U.S. Pat. No. 3,186,120). However, such devices had no integral means for causing flotation to the sheet, i.e., in order to maintain the sheet in a vertical position each sheet had to be buoyed with a series of bobber-like devices which acted against a series of weights attached to one end. In addition, the prior art does not teach the concept of placing all of one species of a fish on a particular decoy, nor does it show the placement of surface feeding fish near the top of the decoy and bottom feeding fish near the bottom of the decoy.

Accordingly it is a primary object of the present invention to provide sheets of transparent material having an air chamber extending along one edge to give the sheet an independent means of flotation.

It is another object of the present invention to provide sheets of transparent material with a plurality of life-like fish images projected thereon, the fish images each having an independent means of inflation to give the image a three dimensional form approximating the average size of the species of fish it represents.

A further object is to place the fish images on the transparent sheets according to how they feed, i.e., surface feeding fish will have that type of fish image appearing near the top of the sheets, while bottom feeding fish will have fish images of that type appearing near the bottom of the sheets.

BRIEF DESCRIPTION OF THE DRAWINGS

Other objects and advantages of the invention will become apparent upon reading the attached detailed description and upon reference to the drawings, in which.

While the invention is described in connection with certain preferred embodiments, it will be understood that I do not intend to be limited to the embodiment shown but intend, on the contrary, to cover the various alternative forms of the invention included within the spirit and scope of the appended claims.

DETAILED DESCRIPTION OF THE INVENTION

Figure 1:
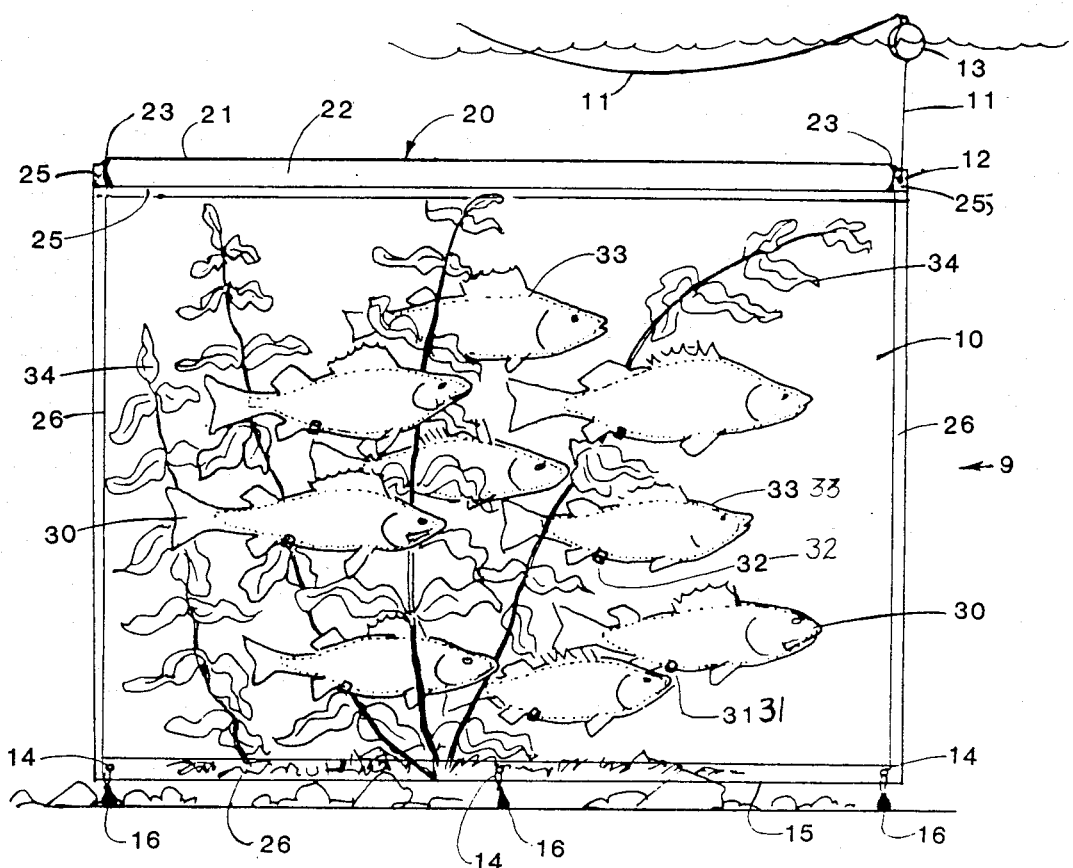
FIG. 1 is an elevation view of the invention showing a plurality of fish images appearing on transparent sheets.

Turning to the drawings there is shown a fish decoy 9 having a pair of thin, transparent sheets 10 with a number of images projected thereon. The sheets 10 may be of any suitable plastic or similar material which has flexability as well as high strength, yet be sufficiently thin to give the images thereon a more life-like appearance when inflated. One such material which has proved satisfactory is polyvinyl acetate, about two mils (0.002 inches) to 12 mils (0.012 inches) thick per sheet, and sold by Eastman Kodak Co. as "Clear Special Grade K4." The sheets 10 are waterproof and are flexible enough to exhibit wave or rippling movements as a result of underwater currents. This rippling effect gives an added life-like appearance to the images on the sheets. The sheets 10 in FIG. 1 are shown in rectangular form, however, it is contemplated that they can be of almost any shape desired.

In order to quickly identify and locate the fish decoy 9, there is line 11 attached to grommet 12 in one corner of sheet 10, the line 11 being held by buoy 13. The buoy 13 floats on the water's surface directly above fish decoy 9 indicating its location while line 11 is used to retrieve the fish decoy 9.

In order to position the fish decoy 9 beneath the surface of a body of water so that the images thereon appear in their natural habitat, a series of grommets 14 are spaced along one edge 15 of sheet 10. A plurality of weights, generally lead weights such as bell sinkers 16, are attached to grommets 14 in sufficient number to submerge sheet 10 and hold it near or on the bottom of the lake or stream.

In one embodiment of the invention, means are provided to give buoyancy to decoy 9 and to hold it upright in a vertical position. To accomplish this, air chamber 20 is provided along edge 21 sheets 10. The air chamber 20 is shown as an elongated tube 22 extending for almost the entire length of edge 21. At each end 23 of tube 22 and along its lower edge 24 there is a seal 25 which is incorporated to entrap air in chamber 20. It is contemplated that seal 25 be formed by a heat seal method, known in the art, to permanently fuse the two thicknesses of sheets 10 together. In addition to sealing sheets 10 together at seal 25, the entire border of decoy 9 has a seal 26 along its perimeter so that water or other foreign objects cannot enter between the sheets. Seal 26 can also be formed by heat sealing to fuse sheets 10 together.

It is contemplated that air chamber 20 will provide sufficient buoyancy so that shapes 10 remain in a vertical position, yet not so much air as to cause the bell sinkers 16 to be raised off the bottom. In addition, just enough buoyancy is desired so that as underwater currents pass through and around fish decoy 9, they will cause a rippling effect which gives a more life-like appearance to the images thereon.

For the purposes of attracting fish to the fishing area, a number of fish images 30 are projected on sheets 10. The arrangement of the fish images 30 can be at random, i.e., with different images of fish appearing to swim in one direction, or in several different directions. It may also be desirable to show different species of fish images swimming at various depths according to the feeding habits of those species. For example, it might be desirable to show an image of a walleye swimming near the bottom of decoy 9 because that particular species of fish generally feed near the bottom. As another example, it may be desirable to locate images of fish such as bass near the upper end of decoy 9 because bass have a tendency to feed near the surface of a lake or stream. It may also be desirable to have a decoy having all one species of fish, or perhaps different species of fish appearing at different levels of the decoy.

Figure 2:
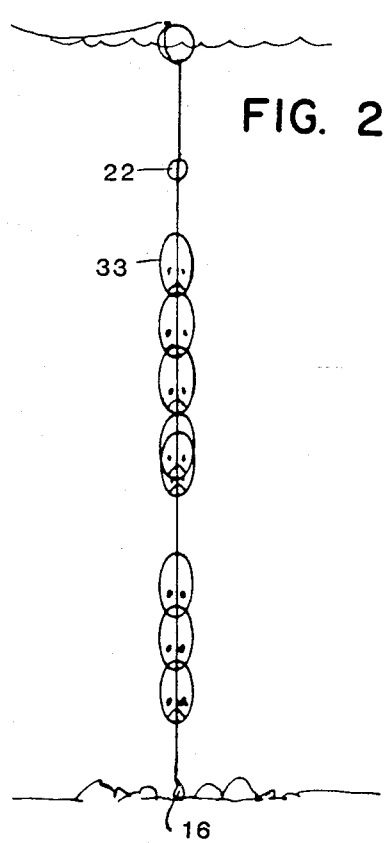
FIG. 2 is an elevation view taken substantially along line 2—2 showing the air chamber and individually inflatable fish.

In order to give each fish image 30 a more life-like appearance, means is provided to individually inflate each fish image 30 to a desired level. A valve stem 31 is attached to one end of each fish image 30 to allow passage of air into the fish image for the purpose of inflating it. The valve stem 31 is similar to that used on a rubber raft or similar device where air is simply blown in through the valve stem 31 and sealed by means of a plug 32 to prevent the fish image 30 from deflating. As shown in FIG. 1, the dotted outline 33 represents the area which will inflate as air is blow into the fish image 30, the area immediately outside the dotted line is heat sealed to form a pocket into which air is blown through valve stem 31. FIG. 2 depicts the end view of the fish decoy 9 showing the fish images 30 in their inflated condition. To aid in storing the fish decoy while it is not in use, the fish images 30 can be deflated so that the decoy is nearly flat so that it can be folded or rolled up.

It is intended that the fish images 30 take on the appearance of real fish by coloring the images according to the color of the species which they represent. However, it may be desirable to color the fish images 30 with brighter colors or even different colors than the color of the species which the image is intended to represent.

In order to portray the fish in its natural habitat, different seaweed images 34 are depicted in and around the fish images 30 as is usually the case with real fish. Again, it is intended that the seaweed images 34 be colored according to the naturally occurring color for that particular type of seaweed, however, differing colors of seaweed may be desired for the purposes of attracting fish.

The use of the decoy sheet formed of transparent flexible plastic film has been found not only to impart a life-like appearance and movement through the fish images printed thereon, buut also the sheet is substantially invisible in the water and it has been found through actual trials that it attracts fish rather than frightening them.

I claim:

1. A fishing decoy comprising two sheets of flexible, transparent material, means for connecting the two sheets along the edges, the sheets having means defining an integral inflatable air chamber extending along the upper edge for flotation purposes and weight means fixed to the lower edge of the sheets opposite the air chamber in order to hold the decoy in a vertical position, underwater, the weight means being sufficient to cause the sheets to submerge to a desired level and the air chamber creating sufficient buoyancy to balance against the weight and maintain the sheet in the relatively vertical position, a plurality of individual life-like fish images projected on the sheet, each of said fish images being formed by a sealed outline inflatable to provide a three-dimensional form approximating the average size of the represented fish, a plurality of seaweed images to depict the fish in their natural habitat, and a retrieving line attached to the upper edge having the air chamber for the purposes of retrieving the decoy from the water.

2. A fishing decoy according to claim 1 wherein all of the fish images are depicted as one species.

3. A fishing device according to claim 1 wherein the fish images are depicted as a combination of species of fish, with certain species of fish that feed near the top of the water appearing near the top of the sheets, while those species of fish that feed near the bottom will appear near the bottom of the sheets.

* * * * *